United States Patent [19]

Hoatson et al.

[11] Patent Number: 4,787,301

[45] Date of Patent: Nov. 29, 1988

[54] DEEP FAT COOKING APPARATUS AND METHOD

[75] Inventors: William J. Hoatson, Springfield; John I. Decker, Jefferson City, both of Mo.

[73] Assignee: Little Chipper, Inc., Jefferson City, Mo.

[21] Appl. No.: 119,332

[22] Filed: Nov. 10, 1987

[51] Int. Cl.$^4$ .............................................. A47J 37/12
[52] U.S. Cl. ........................................ 99/403; 99/336; 99/410; 99/409; 219/422
[58] Field of Search ................. 99/330, 331, 336, 448, 99/415, 410, 450, 413, 409, 407, 403, 329 R; 219/437, 422, 441

[56] References Cited

U.S. PATENT DOCUMENTS

| | | | |
|---|---|---|---|
| 1,990,351 | 2/1935 | Shroyer | 99/331 |
| 2,053,568 | 9/1936 | Levin | 99/413 |
| 2,109,212 | 2/1938 | Ehrgott . | |
| 2,196,968 | 4/1940 | Bemis . | |
| 2,246,854 | 6/1941 | Meletio | 99/331 |
| 2,367,448 | 1/1945 | Thiele . | |
| 2,528,776 | 11/1950 | Pappas . | |
| 2,848,938 | 9/1958 | Klein | 99/403 |
| 3,018,716 | 1/1962 | Pass | 99/413 |
| 3,626,840 | 12/1971 | Day | 99/403 |
| 3,869,972 | 3/1975 | Chase | 99/403 |
| 3,919,523 | 4/1978 | Wadia et al. | 219/437 |
| 4,321,859 | 3/1982 | Rimmeir | 99/416 |
| 4,508,027 | 4/1985 | McCord | 99/450 |
| 4,574,183 | 3/1986 | Knauss | 99/450 |

FOREIGN PATENT DOCUMENTS 1768 of 1906 United Kingdom .

Primary Examiner—Harvey C. Hornsby
Assistant Examiner—J. Dwight Poffenberger, Jr.
Attorney, Agent, or Firm—Dowell & Dowell

[57] ABSTRACT

A deep fat fryer, especially for potato chips, has a cradle screen with walls and lifting handles and means for supporting the cradle screen at a lower level within the cooking kettle, a cover screen with lifting handles being selectively insertable into the product above the cradle screen for stirring it or placed over the product and resting on the walls of the cradle screen for keeping the product submerged. When the oil is at a lower level, the cradle screen is removed from the kettle after an initial cooking period and inserted into the product for stirring it and is then supported at a higher level over the product for keeping it submerged. The cradle screen walls have an opening to permit scooping of the product into the cradle screen after cooking. The cooking method includes varying the heating rate in order to control the rate of temperature rise of the oil after it drops to its lowest point following loading of the product into the kettle.

8 Claims, 3 Drawing Sheets

DEEP FAT COOKING APPARATUS AND METHOD

BACKGROUND OF THE INVENTION

1. Field of the Invention

This invention relates to food preparation and more particularly to a deep fat fryer especially adapted for the cooking of potato chips from raw sliced potatoes

2. Description of the Prior Art

Deep fat fryers, particularly for potato chips, have been known in the art. These have generally been large and expensive and not adapted for a relatively small scale operation.

Among the U.S. patents are the following. The patent to Ehrgott U.S. Pat. No. 2,109,212 discloses a cooker having spaced heating elements beneath the bottom of the basket.

The patent to Bemis U.S. Pat. No. 2,196,968 discloses a cooker having support means within the cooking compartment for a basket and having heating elements in the lower portion of the cooking compartment.

The patent to Thiele U.S. Pat. No. 2,367,448 discloses a cooking basket and cover.

The patent to Pappas U.S. Pat. No. 2,528,776 discloses a cooking kettle having splash guards around its upper periphery.

The patent to Rimmeir U.S. Pat. No. 4,321,859 discloses a basket having a lower portion and a separable lid.

The patent to Knauss U.S. Pat. No. 4,574,183 discloses a cooking container having a basket and spaced heating elements.

DESCRIPTION OF THE PREFERRED EMBODIMENT

Figure 1:
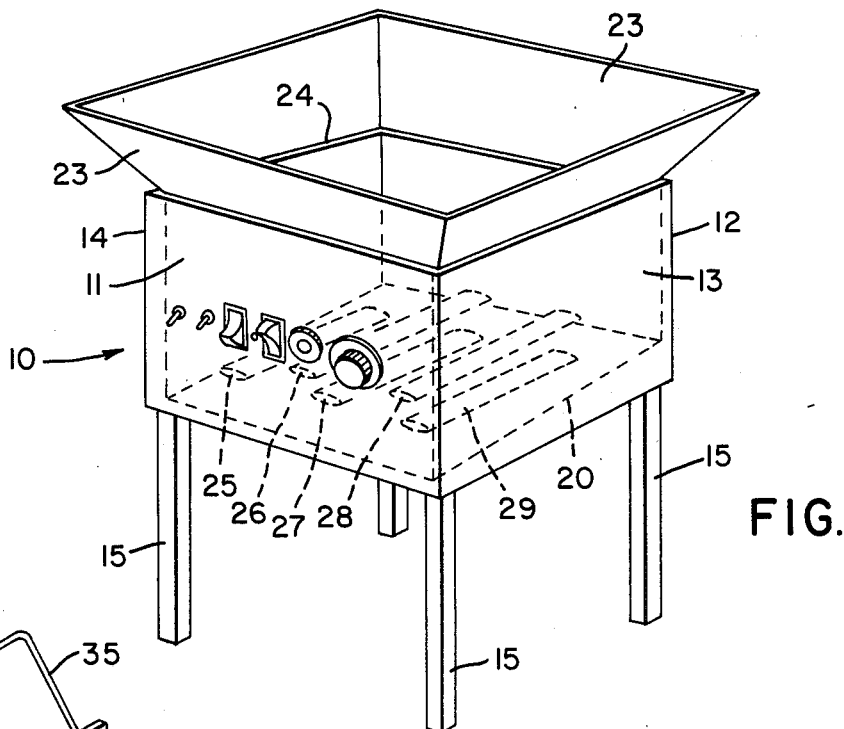
FIG. 1 is a perspective of apparatus in accordance with the present invention.
Figure 2:
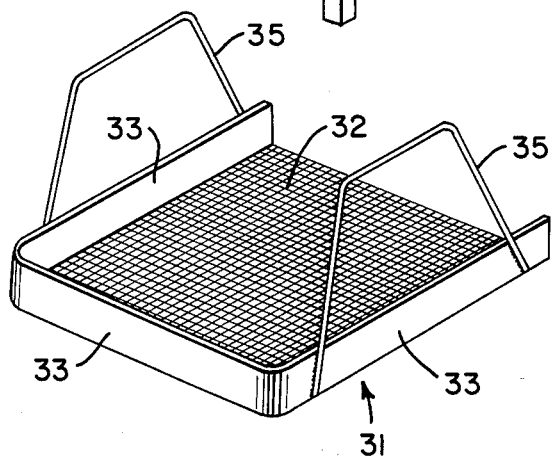
FIG. 2 is a perspective of a cradle screen.
Figure 3:
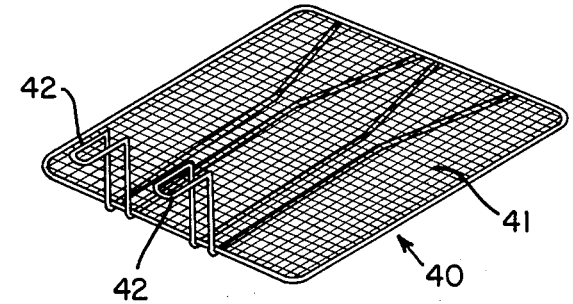
FIG. 3 is a perspective of a cover screen.

It is an object of the present invention to provide a deep fat cooking apparatus and method which is especially designed for a relatively small scale operation and which has a high production efficiency.

It is a further object of the invention to provide a deep fat cooker which is adapted for a changing level of cooking oil as the oil is gradually consumed, the apparatus being used in one way when the level is relatively high and in a different manner when the level drops below a predetermined height. The apparatus is not only efficient to use but is relatively simple in nature and can easily be made.

It is a further object of the present invention to provide a cooking method with the rate of heat applied to the cooking apparatus continuously controlled.

With further reference to the drawings, there is illustrated a supporting frame 10 having a front 11, a rear wall 12 and sides 13 and 14 which is supported on legs 15 which may be adjustable in height. The frame has a relatively thick insulated wall 17 on its sides and on the bottom 18.

Carried within the frame is a cooking kettle 20 having front, rear and side walls corresponding in position to those of the outer frame. The bottom wall of the kettle is higher at the rear portion and angles toward the front in order to provide a drain 22 in its front central portion, although it may be located differently, if preferred.

The upper edges of the front, rear and side walls have outwardly angled splash guards 23 mounted slightly outwardly of the upper edges to provide ledges 24 at the joint therebetween.

Figure 8:
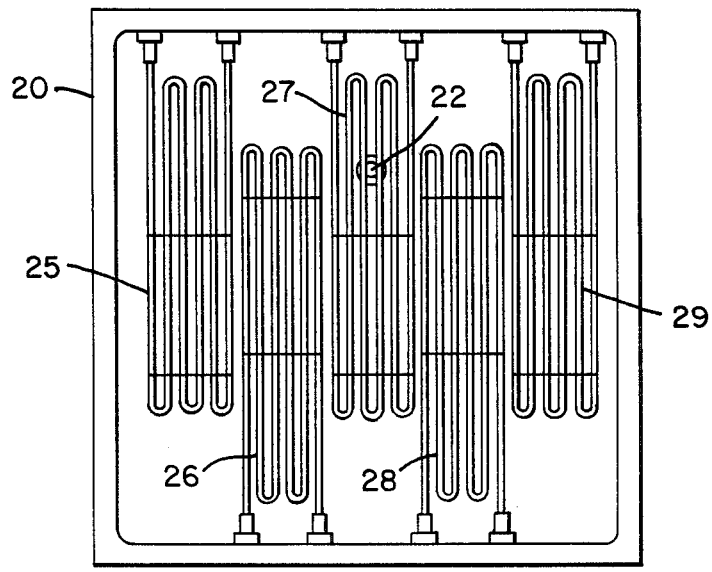
FIG. 8 is a plan view of the bottom of the kettle showing a preferred arrangement of heating elements

Mounted on the bottom wall of the frame or adjacent thereto are a series of heating elements or coils 25-29 which may be alternately arranged as indicated in FIG. 8. The controls for these elements are mounted on and extend through the front wall 11 of the frame 10 in order that individual elements may be energized as desired. Other heating means known in the art could be used such as gas burners or infrared elements.

The kettle has support bars 30 extending inwardly from each side for receiving and supporting the side walls of a cradle screen or basket 31. The cradle screen 31 has a perforated bottom 32 and stainless steel walls 33 along its sides and one end thereof but open at the opposite end. For lifting the cradle screen, side handles 35 are attached to either side of the side walls 33. A cover screen 40 is also provided having a screen bottom 41 and lifting handles 42 which are disposed inwardly of the sides as indicated in the drawing. The lateral extent of the cover screen is such that it may be placed upon the upper edges of the walls 33 of the cradle screen for support thereon as indicated in the drawing FIG. 4.

Figure 4:
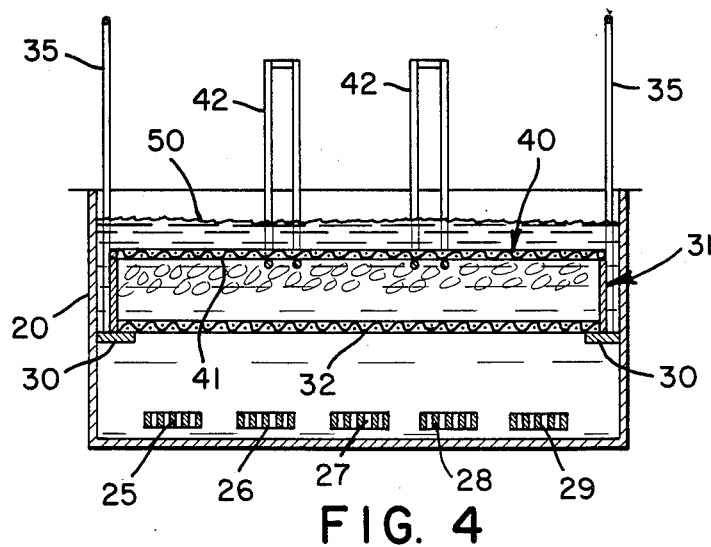
FIG. 4 is a vertical section of a frying kettle illustrating the cradle screen and the cover screen in position for frying.
Figure 5:
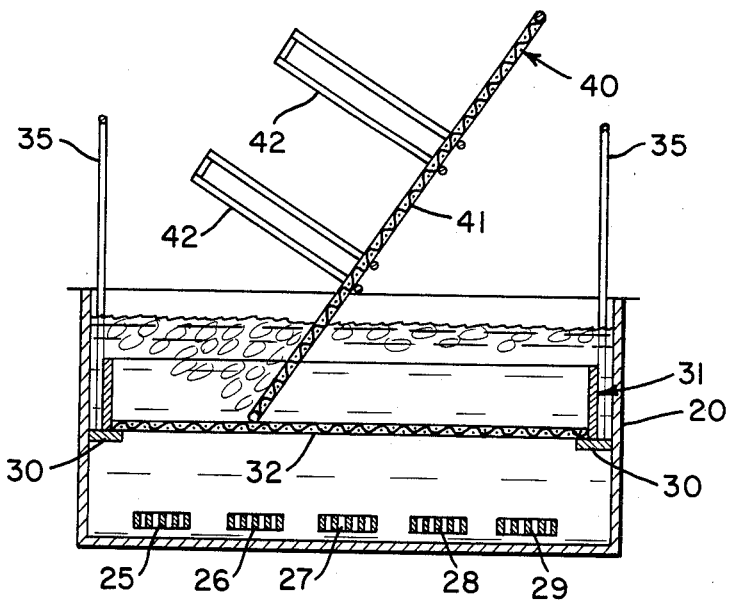
FIG. 5 is a vertical section similar to FIG. 4 illustrating the use of the cover screen for rearranging the fried product pieces during cooking.

In the operation of the device, assuming that the procedure is beginning with a relatively high liquid level 50 as indicated in FIG. 4, the cradle screen 31 is first placed within the kettle and after the oil has reached the proper temperature as caused by the energization of the heating elements 25-29, a load of product, e.g. sliced potatoes, is placed in the kettle above the level of the bottom 32 of the cradle screen. After a period of time, the potato slices will begin to float. At this point, in order to prevent their sticking together and to rearrange them as may be desired, the cover screen is used as indicated in FIG. 5 to stir and rearrange the potato slices and then the cover screen is placed over the potatoes as indicated in FIG. 4 in order to hold those that are floating beneath the level of the hot cooking liquid After a suitable period of time when the potatoes are cooked, they may be raised out of the cooking oil and drained as will presently be described.

The front and rear splash guards 23 are so spaced that when the cradle screen 31 is rotated approximately 45° about a vertical axis, two of its diagonally opposite corners may rest upon the splash guards and a back corner away from the open end lowered into contact with the ledge 24 in order to permit draining of oil from the product back into the kettle. After this procedure, the basket is dumped and then placed back into the kettle for a new cooking load.

Figure 6:
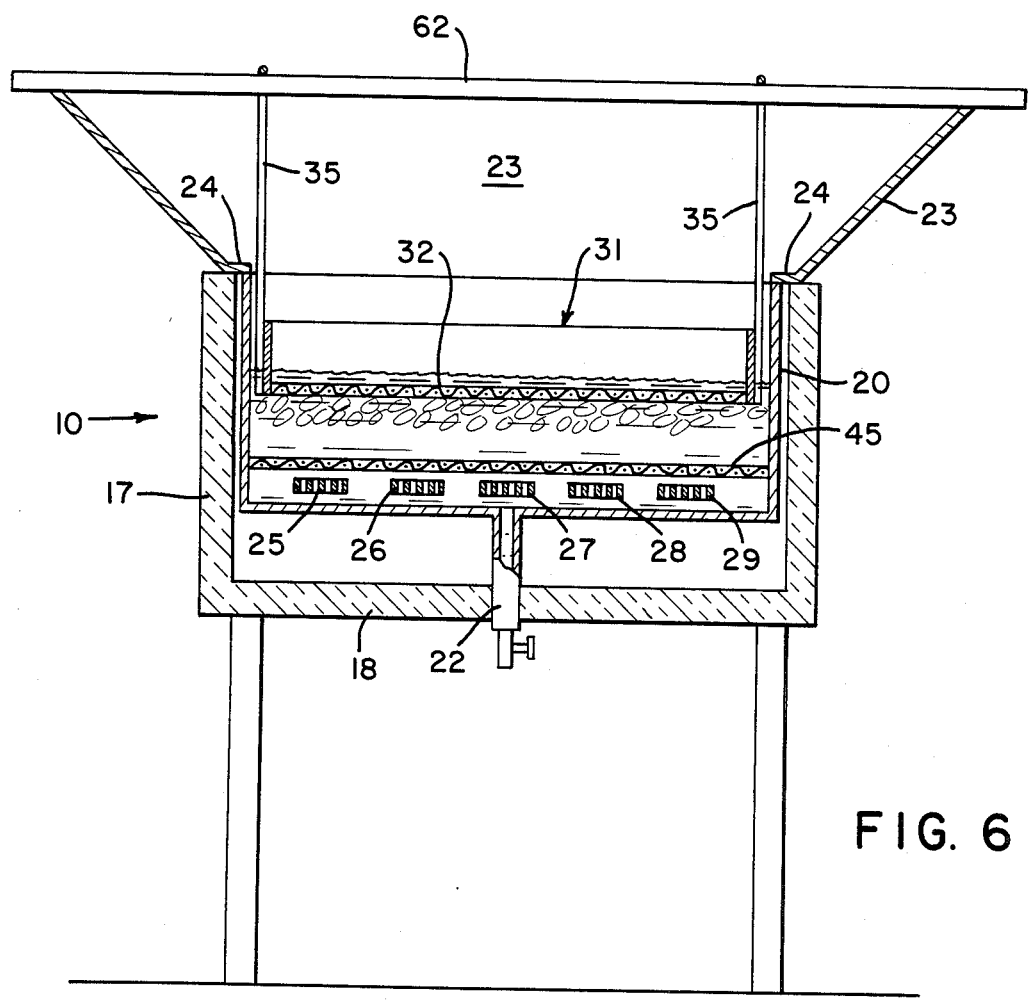
FIG. 6 is a view similar to FIG. 4 illustrating the arrangement of the cradle screen over the potatoes when the oil level is relatively low.
Figure 7:
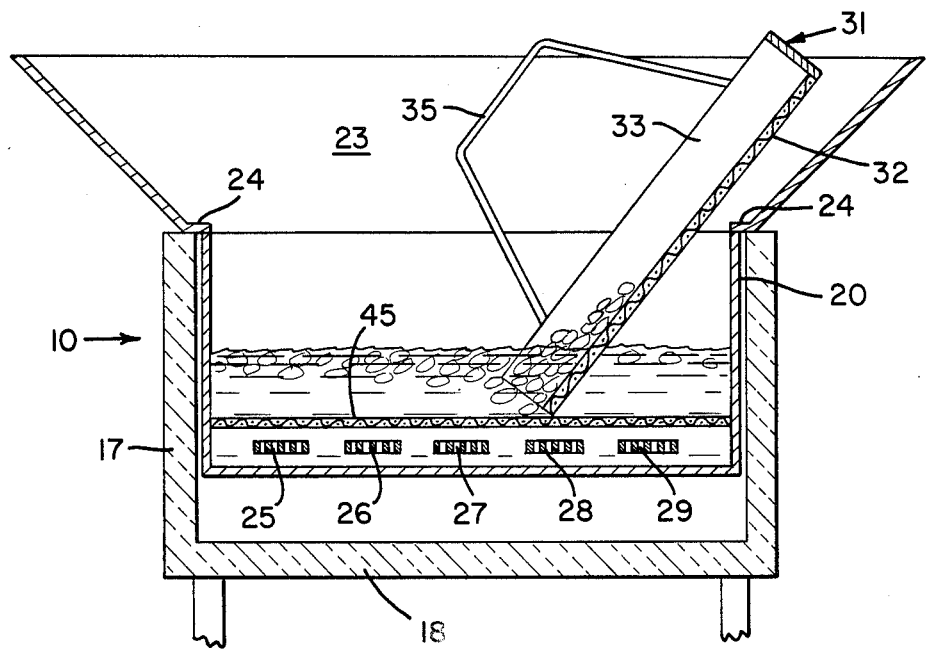
FIG. 7 is a view similar to FIG. 6 illustrating the use of the cradle screen in rearranging the potatoes as they are being fried and for collecting them in the cover screen after they are fried.

After a period of time, the level of cooking oil becomes substantially less as indicated in FIGS. 6 and 7. When this occurs, the sliced raw potatoes are loaded into the kettle over the cradle screen, as before. After a period of cooking in which the slices begin to float, the cradle screen is lifted from the oil and the product is dumped back into the kettle for further cooking and the cradle screen is then used as indicated in FIG. 7 in order to rearrange the potatoes and prevent their sticking together Then the cradle screen is lowered into the cooking oil, submerging the potato slices. The cradle screen handle is supported by a rod 62 which is supported on the upper edges of the splash guards as indicated in FIG. 6 in order to avoid forcing the slices down onto the coils. After the potato slices are cooked, the cradle screen is used to scoop them out of the frying oil for draining as previously described. If desired, an auxiliary screen 45 may be mounted over and in close proximity to the coils 25-29 in order to keep the potato slices out of contact with the coils and to facilitate stirring and removal of the slices While the sizes and proportions of the kettle and screen members may vary, as desired, by way of example the kettle may be 24" length and width and 8" deep. At its bottom are five 6000 watt 240 volt heating elements. The outer frame sides may be 28" length and width and 15" deep with 1" of hard fiberglass insulation between the outer frame sides and the kettle. The splash guards are of 10" width and extend at 60° from the top of the kettle. The cradle screen and cover screen are each 23" length and width. The wall around the cradle screen is 3" high and its handles extend 13" above the screen. The lifting handles for the cover screen extend 9" above the screen.

The proportions and combination of elements of the preferred embodiment provides for a fryer that may be of relatively small size and relatively inexpensive to produce and have a high production efficiency. In the example described 100 pounds of cooking oil would be used at the start for cooking 10 pounds of sliced potatoes to produce potato chips. It is believed that the ratio of product load to cooking oil is higher than that of other potato chip cookers.

The use of individual controls for the heating elements permits maximum heating at the start and reduced heating at a later stage. By way of example, at the start, at high oil level, the 10 pounds of product are poured into the kettle into the cradle screen when the oil temperature has reached 335° F., with all five elements energized. Four minutes after drop time, the oil temperature has dropped to 270° F. and begun to rise. Six minutes after drop time, the temperature rises to 290° F. and one of the heating elements is turned off to slow the heat recovery. Approximately seven to seven and one-half minutes after drop time, the potato chips are removed and the heating element is turned back on in preparation for the next load.

At the low oil level, ten pounds of sliced potatoes are loaded at 335° F. with all elements energized. Three minutes after drop time, the temperature reaches its lowest point and begins to recover. Five minutes after drop time, the temperature reaches 290° F. and one of the heating elements is turned off to slow the heat recovery. One minute later, another heating element is turned off to slow the heat recovery. Approximately seven to seven and one-half minutes after drop time, the chips are removed and the switches turned back on to prepare for the next load.

After frying approximately four hundred pounds of potatoes, the oil level is low enough that the cradle screen no longer keeps the floating chips submerged. The oil is then drained through a common filter cone (not shown), poured back into the kettle, replenished with the required amount of new oil, and the high oil level frying procedure started again.

We claim:

1. Deep fat frying apparatus for immersion cooking of a product in pieces comprising, a kettle having walls with upper edges and a bottom, means for heating the contents of the kettle, a cradle screen having a tray portion including a screen bottom fitting proximately within the walls of said kettle and having walls extending upwardly from the screen bottom along a portion of its periphery, another portion thereof being open to permit the product to be scooped out of the kettle into the screen, and handle means extending upwardly from the tray portion, a cover screen having a screen bottom fitting proximately within the walls of said kettle, and handle means extending upwardly from said screen bottom, whereby, with a relatively high level of fat within the kettle, the cradle screen may be lower thereinto, the product introduced into the kettle above the screen bottom of the cradle screen, and the cover screen lowered into a position above the product in order to keep it submerged above the cradle screen, said cover screen being liftable by its handle means and an edge of its screen bottom being insertable at an angle into the contents of the kettle above the screen bottom of said cradle screen for stirring the product during cooking, and whereby when cooking is completed the product may be lifted out of the kettle in said cradle screen.

2. The invention of claim 1, and means positioned adjacent to the kettle bottom for supporting the cradle screen in spaced relation above said bottom.

3. The invention of claim 1, and means for supporting the handle means of the tray portion with its screen bottom spaced substantially above the bottom of the kettle, whereby, with a relatively low level of fat within the kettle, the product may be immersed in the fat and held below the level of the screen bottom of the cradle screen.

4. The invention of claim 1, in which said heating means comprises a plurality of heating elements positioned across the bottom of said kettle, and means for individually controlling one or more of said elements.

5. The invention of claim 4, and temperature responsive means for controlling all of said elements.

6. The invention of claim 1, said kettle being rectangular in horizontal section and having corners, and walls providing splash guard means extending upwardly and outwardly from the walls of said kettle at the upper edges thereof, ledge means formed at the junction of at least one of said splash guard walls and one of said kettle walls and inwardly of said splash guard wall, said cradle screen being positionable with its screen bottom above the level of the upper edges of said kettle walls and with two of its diagonally disposed corners resting on oppositely disposed splash guard walls, and said cradle screen being tiltable from such position to a position in which one of its corners rests on said ledge means, whereby said cradle screen is supported above said kettle in a position for draining oil from the product back into the kettle.

7. Deep fat frying apparatus for immersion cooking of a product in pieces comprising, a kettle having walls and a bottom, means for heating the contents of the kettle, a cradle screen having a tray portion including a screen bottom fitting proximately within the walls of said kettle, walls extending upwardly from the screen bottom around a portion thereof but leaving an open portion with a screen edge for insertion at an angle into the contents of the kettle for stirring the contents during cooking or for scooping the contents into the tray portion, handle means extending upwardly from the tray portion, and means for supporting the handle means with the tray portion spaced substantially above the bottom of the kettle, whereby, with a relatively low level of fat within the kettle, the product may be immersed in the fat and held below the level of the screen bottom of the cradle screen with the handle means carried by the support means, and whereby the product may be stirred and removed through use of the tray portion.

8. The invention of claim 7, first support means positioned adjacent to the kettle bottom, a cover screen having a handle and screen bottom fitting proximately within the walls of said kettle, and handle means extending upwardly from said screen bottom, whereby, with a relatively high level of fat within the kettle, the cradle screen may be lowered thereinto to a position in which its rests on said first support means, the product introduced into the kettle above the screen bottom of the cradle screen, and the cover screen lowered into a position in which it rests on and is supported by the walls of said cradle screen, said cover screen being liftable by its handle and an edge of its screen bottom being insertable at an angle into the contents of the kettle above the screen bottom of said cradle screen for stirring the product during cooking, and whereby when cooking is completed the product may be lifted out of the kettle in said cradle screen.

* * * * *